US009732904B1

(12) United States Patent
Wronski

(10) Patent No.: US 9,732,904 B1
(45) Date of Patent: Aug. 15, 2017

(54) ADJUSTABLE HANGER BAR ASSEMBLY FOR LUMINAIRES

(71) Applicant: Grzegorz Wronski, Peachtree City, GA (US)

(72) Inventor: Grzegorz Wronski, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 84 days.

(21) Appl. No.: 14/732,404

(22) Filed: Jun. 5, 2015

(51) Int. Cl.

| | |
|---|---|
| ***F21V 21/04*** | (2006.01) |
| ***F16M 13/02*** | (2006.01) |
| ***F21S 8/02*** | (2006.01) |
| ***F21V 21/14*** | (2006.01) |
| *F21W 131/40* | (2006.01) |
| *F21W 131/30* | (2006.01) |

(52) U.S. Cl.
CPC ........ *F16M 13/022* (2013.01); *F16M 13/027* (2013.01); *F21S 8/026* (2013.01); *F21V 21/047* (2013.01); *F21V 21/14* (2013.01); *F21W 2131/30* (2013.01); *F21W 2131/40* (2013.01)

(58) Field of Classification Search
CPC .... F16M 13/022; F16M 13/027; F21V 21/14; F21V 21/047; F21V 21/048; F21V 21/04; F21S 8/026; F21W 2131/30; F21W 2131/40
See application file for complete search history.

(56) References Cited

U.S. PATENT DOCUMENTS

| | | | |
|---|---|---|---|
| 1,156,885 | A | 10/1915 | Caine |
| 1,350,295 | A | 8/1920 | Champeau |
| 1,622,087 | A | 3/1927 | Calderwood |
| 1,756,361 | A | 4/1930 | Johnson |
| 1,791,480 | A | 2/1931 | Smith et al. |
| 1,821,733 | A | 9/1931 | Thibodeau |
| 2,316,389 | A | 4/1943 | Atkinson |
| 2,518,515 | A | 8/1950 | Austin |
| 2,658,241 | A | 11/1953 | Houghton et al. |
| 2,713,983 | A | 7/1955 | Kay |
| 2,802,933 | A | 8/1957 | Broadwin |
| 2,887,568 | A | 5/1959 | Franck |

(Continued)

OTHER PUBLICATIONS

Halo Lighting "Edison Recessed Lighting" Cooper Industries No. ADV 693025 Jan. 1984.

(Continued)

*Primary Examiner* — Peggy Neils
(74) *Attorney, Agent, or Firm* — King & Spalding LLP

(57) ABSTRACT

A hanger bar assembly includes a first hanger bar member and a first attachment head coupled to the first hanger bar member by a first coupling segment that is horizontally offset from the first hanger bar member. The hanger bar assembly further includes a second hanger bar member and a second attachment head coupled to the second hanger bar member by a second coupling segment. The first hanger bar member and the second hanger bar member are designed to interlock with each other. An end portion of the first hanger bar member is designed to extend past the second attachment head, and an end portion of the second hanger bar member is designed to extend past the first attachment head through a gap that is between the first hanger bar member and first attachment head.

20 Claims, 17 Drawing Sheets

(56) References Cited

U.S. PATENT DOCUMENTS

| | | | |
|---|---|---|---|
| 2,930,564 | A | 3/1960 | Maier |
| 2,933,549 | A | 4/1960 | Antonucci |
| 3,040,172 | A | 6/1962 | Chan |
| 3,099,404 | A | 7/1963 | Kaufman et al. |
| 3,102,306 | A | 9/1963 | Hutchinson |
| 3,104,087 | A | 9/1963 | Budnick et al. |
| 3,154,001 | A | 10/1964 | Zurawski |
| 3,162,413 | A | 12/1964 | Hexdall |
| 3,300,634 | A | 1/1967 | Libreman |
| 3,313,931 | A | 4/1967 | Kugman |
| 3,597,889 | A | 8/1971 | Nigro |
| 3,609,338 | A | 9/1971 | Kripp |
| 3,710,096 | A | 1/1973 | McFarlin |
| 4,022,415 | A | 5/1977 | Roderick et al. |
| 4,040,589 | A | 8/1977 | McLay |
| 4,041,657 | A | 8/1977 | Schuplin |
| 4,086,480 | A | 4/1978 | Lahm |
| 4,114,327 | A | 9/1978 | Williams |
| 4,122,762 | A | 10/1978 | Williams |
| 4,149,693 | A | 4/1979 | LoNigro |
| 4,165,851 | A | 8/1979 | Bowden et al. |
| 4,190,355 | A | 2/1980 | Avery et al. |
| 4,230,900 | A | 10/1980 | Speet |
| 4,290,098 | A | 9/1981 | Pierson |
| 4,336,575 | A | 6/1982 | Gilman |
| 4,388,677 | A | 6/1983 | Druffel |
| 4,391,428 | A | 7/1983 | Grimes |
| 4,406,216 | A | 9/1983 | Hott et al. |
| 4,408,262 | A | 10/1983 | Kusmer |
| 4,475,147 | A | 10/1984 | Kristofek |
| 4,511,113 | A | 4/1985 | Druffel et al. |
| 4,519,019 | A | 5/1985 | Hall |
| 4,545,000 | A | 10/1985 | Fraley et al. |
| 4,564,888 | A | 1/1986 | Lewin et al. |
| 4,566,057 | A | 1/1986 | Druffel |
| 4,569,003 | A | 2/1986 | Elmer et al. |
| 4,577,824 | A | 3/1986 | Druffel et al. |
| 4,646,212 | A | 2/1987 | Florence |
| 4,670,822 | A | 6/1987 | Baker |
| 4,723,747 | A | 2/1988 | Karp et al. |
| 4,729,080 | A | 3/1988 | Fremont et al. |
| 4,742,440 | A | 5/1988 | Guzzini |
| 4,754,377 | A | 6/1988 | Wenman |
| 4,757,967 | A | 7/1988 | Delmore et al. |
| 4,760,510 | A | 7/1988 | Lahti |
| 4,760,981 | A | 8/1988 | Hodges |
| 4,762,162 | A | 8/1988 | Chochrek |
| 4,796,169 | A | 1/1989 | Shemitz |
| 4,803,603 | A | 2/1989 | Carson |
| 4,829,410 | A | 5/1989 | Patel |
| 4,872,097 | A | 10/1989 | Miller |
| 4,930,054 | A | 5/1990 | Krebs |
| 4,967,990 | A | 11/1990 | Rinderer |
| 4,972,339 | A | 11/1990 | Gabrius |
| 4,978,092 | A | 12/1990 | Nattel |
| 5,029,794 | A | 7/1991 | Wolfe |
| 5,034,867 | A | 7/1991 | Mayer |
| 5,044,582 | A | 9/1991 | Walters |
| 5,045,985 | A | 9/1991 | Russo et al. |
| 5,057,979 | A | 10/1991 | Carson et al. |
| 5,073,845 | A | 12/1991 | Aubrey |
| 5,074,515 | A | 12/1991 | Carter, Jr. |
| 5,075,828 | A | 12/1991 | Gordin et al. |
| 5,075,831 | A | 12/1991 | Stringer et al. |
| 5,130,913 | A | 7/1992 | David |
| 5,176,345 | A | 1/1993 | Medlin |
| 5,178,503 | A | 1/1993 | Losada |
| 5,209,444 | A | 5/1993 | Rinderer |
| 5,222,800 | A | 6/1993 | Chan et al. |
| 5,291,381 | A | 3/1994 | Price |
| 5,316,254 | A | 5/1994 | McCartha |
| D351,481 | S | 10/1994 | Cole, Jr. |
| 5,374,812 | A | 12/1994 | Chan et al. |
| 5,379,199 | A | 1/1995 | Hirshenhorn et al. |
| 5,386,959 | A | 2/1995 | Laughlin et al. |
| 5,452,816 | A | 9/1995 | Chan et al. |
| 5,457,617 | A | 10/1995 | Chan et al. |
| 5,505,419 | A | 4/1996 | Gabrius |
| 5,571,256 | A | 11/1996 | Good et al. |
| 5,581,448 | A | 12/1996 | Harwood |
| 5,588,737 | A | 12/1996 | Kusmer |
| 5,595,028 | A | 1/1997 | Handzlik |
| 5,597,234 | A | 1/1997 | Winkelhake |
| 5,618,017 | A | 4/1997 | DeBoer |
| 5,619,263 | A | 4/1997 | Laughlin et al. |
| 5,623,789 | A | 4/1997 | Kidwell et al. |
| D384,431 | S | 9/1997 | Bitton |
| 5,662,413 | A | 9/1997 | Akiyama |
| 5,662,414 | A | 9/1997 | Jennings et al. |
| 5,678,799 | A | 10/1997 | Jorgensen et al. |
| 5,690,423 | A | 11/1997 | Hentz et al. |
| 5,738,436 | A | 4/1998 | Cummings et al. |
| 5,746,507 | A | 5/1998 | Lee |
| 5,758,959 | A | 6/1998 | Sieczkowski |
| 5,800,051 | A | 9/1998 | Gampe et al. |
| 5,826,970 | A | 10/1998 | Keller et al. |
| 5,845,886 | A | 12/1998 | McCormick |
| 5,857,766 | A | 1/1999 | Sieczkowski |
| 5,873,556 | A | 2/1999 | Reiker |
| 5,934,631 | A | 8/1999 | Becker et al. |
| 5,954,304 | A | 9/1999 | Jorgensen |
| 5,957,573 | A | 9/1999 | Wedekind et al. |
| 5,957,574 | A | 9/1999 | Hentz et al. |
| 6,004,011 | A | 12/1999 | Sieczkowski |
| 6,030,102 | A | 2/2000 | Gromotka |
| 6,033,098 | A | 3/2000 | Hentz et al. |
| 6,076,788 | A | 6/2000 | Akiyama |
| 6,082,878 | A | 7/2000 | Doubek et al. |
| 6,085,916 | A | 7/2000 | Kovacevic et al. |
| 6,105,918 | A | 8/2000 | Gromotka |
| 6,164,802 | A | 12/2000 | Gromotka |
| 6,216,992 | B1 | 4/2001 | Bisonaya et al. |
| 6,231,205 | B1 | 5/2001 | Slesinger et al. |
| 6,286,265 | B1 | 9/2001 | Rinderer |
| 6,296,211 | B1 | 10/2001 | Snyder |
| 6,332,597 | B1 | 12/2001 | Korcz et al. |
| 6,341,466 | B1 | 1/2002 | Kehoe et al. |
| 6,345,800 | B1 | 2/2002 | Herst et al. |
| 6,431,723 | B1 | 8/2002 | Schubert et al. |
| 6,461,016 | B1 | 10/2002 | Jamison et al. |
| 6,471,374 | B1 | 10/2002 | Thomas et al. |
| 6,484,980 | B2 | 11/2002 | Medlin, Sr. et al. |
| 6,505,960 | B2 | 1/2003 | Schubert et al. |
| 6,519,791 | B2 | 2/2003 | Randolph |
| 6,527,406 | B1 | 3/2003 | Slesinger et al. |
| 6,609,690 | B1 | 8/2003 | Davis |
| 6,637,705 | B2 | 10/2003 | Sjoblom et al. |
| 6,688,069 | B2 | 2/2004 | Zadeh |
| 6,691,968 | B1 | 2/2004 | Tseng |
| 6,726,347 | B2 | 4/2004 | Wronski |
| 6,805,916 | B2 | 10/2004 | Cadieu |
| D552,969 | S | 10/2007 | Bobrowski et al. |
| 7,673,841 | B2 | 3/2010 | Wronski |
| 7,735,795 | B2 | 6/2010 | Wronski |
| 7,784,754 | B2 | 8/2010 | Nevers et al. |
| 7,810,775 | B2 | 10/2010 | Dal Ponte et al. |
| 7,832,889 | B1 | 11/2010 | Cogliano |
| 7,874,539 | B2 | 1/2011 | Wright et al. |
| 7,896,529 | B2 | 3/2011 | Wronski |
| 8,038,113 | B2 | 10/2011 | Fryzek et al. |
| 8,177,176 | B2 | 5/2012 | Nguyen et al. |
| 8,240,630 | B2 | 8/2012 | Wronski |
| 8,622,361 | B2 | 1/2014 | Wronski |
| 8,939,418 | B2 * | 1/2015 | Green .................. F16M 13/022 248/200.1 |
| 2005/0183344 | A1 | 8/2005 | Ziobro et al. |
| 2005/0230589 | A1 | 10/2005 | Wronski |
| 2005/0247842 | A1 | 11/2005 | Wronski |
| 2007/0012847 | A1 | 1/2007 | Tai |
| 2007/0075206 | A1 | 4/2007 | Wright et al. |
| 2007/0261881 | A1 | 11/2007 | Wronski |
| 2009/0231861 | A1 | 9/2009 | Wedekind |

(56) References Cited

U.S. PATENT DOCUMENTS

| | | | |
|---|---|---|---|
| 2010/0110705 | A1 | 5/2010 | Nguyen et al. |
| 2010/0224404 | A1 | 9/2010 | Rippel et al. |
| 2014/0301087 | A1 | 10/2014 | Wronski et al. |

OTHER PUBLICATIONS

"Edison Lighting" ET 7001 P Cooper Industries 694917 Sep. 1989.
"Edison Lighting" ET 7070 ET 7071 ET7301 ET7401 ET 7410 Cooper Industries 694979 Dec. 1987.
Sears Owner's Manual Model No. 9 89575 694954 Oct. 1987.
Halo H-7T H-27T H-71CT H274 H275 Bar Hanger Installation Instruction 695876 Jun. 1989.
Halo H& Housing with Improved Plaster Frame Cooper Industries 692601 Jul. 1981.
Juno Lighting; Product specification; 6" Deluxe Universal TC Housing; TC2; Feb. 2009.
Juno Lighting; Product specification; 6" Vertical IC Compact Fluorescent Housing; ICPL618E; Aug. 2012.
Philips Lightolier; Product specification; Lytening LED; Oct. 2012.
Progress Lighting; Product specification; 5" Shallow Housing IC, Non-IC & Air-Tight; Nov. 2001.
Progress Lighting; Product specification; 6" Housing IC, Non-IC & Air-Tight; Nov. 2013.
Progress Lighting; Product specification; 6" Housing IC, Non-IC & Air-Tight w/ Quick Connects; Nov. 2013.
Nora Lighting; Product specification; NHRIC-504QAT; 5" IC Air-Tight Line Voltage Remodel Housing; Jan. 2, 2002.
Wac Lighting; Product specification; R-602D-N-ICA; 6" Line Voltage New Construction Housing 120V-IC Rated-Airtight Ready; Apr. 2014.
Prescolite; LiteBox-Light Commercial and Residential Downlights; Catalog; Jan. 2009.
Prescolite; LiteBox 6"; Product specification; New Construction DBXMRI; Mar. 22, 2011.
Lithonia Lighting; Residential Recessed Downlighting Guide; Feb. 2014.

* cited by examiner

ADJUSTABLE HANGER BAR ASSEMBLY FOR LUMINAIRES

TECHNICAL FIELD

The present disclosure relates generally to lighting solutions, and more particularly to adjustable hanger bar assemblies that are used for mounting a luminaire on support structures.

BACKGROUND

A luminaire (i.e., a light fixture) is typically a complete lighting unit consisting of one or more lamps, socket, and optical devices for distributing light. A recessed luminaire is an example of a luminaire that is installed behind a structure such as a ceiling. Recessed luminaires are used in both commercial and residential applications. For example, a recessed luminaire is typically mounted on support structures behind a ceiling wall that has an opening to allow light from the recessed luminaire to illuminate an area below the ceiling wall.

Various support systems have been employed to support recessed luminaires. For example, recessed luminaires are often suspended between support structures such as joists and T-bar structures. To illustrate, a recessed luminaire may be supported by hanger bars that extend between parallel support structures. Generally, hanger bars need to have adequate strength and rigidity to reliably support a recessed luminaire. Further, because the spacing between the support structures such as the joists of a ceiling structure may vary, adjustability of the lengths of hanger bars is desirable for easy installation as well as for compatibility with different spacings between support structures. Hanger bars that are easy to install can save time and expenses.

Thus, hanger bars that are adjustable in length to simplify installation and that allow usability with support structures that may have different spacings are desirable.

SUMMARY

In general, the present disclosure relates to an adjustable hanger bar for mounting a luminaire on a support structure. In an example embodiment, a hanger bar assembly includes a first hanger bar member and a first attachment head coupled to the first hanger bar member by a first coupling segment that is horizontally offset from the first hanger bar member. The hanger bar assembly further includes a second hanger bar member and a second attachment head coupled to the second hanger bar member by a second coupling segment. The first hanger bar member and the second hanger bar member are designed to interlock with each other. An end portion of the first hanger bar member is designed to extend past the second attachment head, and an end portion of the second hanger bar member is designed to extend past the first attachment head through a gap that is between the first hanger bar member and first attachment head.

In another example embodiment, a hanger bar assembly includes a first hanger bar member and a first attachment head coupled to the first hanger bar member by a first coupling segment that is horizontally offset from the first hanger bar member. The hanger bar assembly further includes a second hanger bar member slidably interlocked with the first hanger bar member. The hanger bar assembly also includes a second attachment head coupled to the second hanger bar member by a second coupling segment. An end portion of the first hanger bar member is designed to extend past the second attachment head, and an end portion of the second hanger bar member is designed to extend past the first attachment head through a gap that is between the first hanger bar member and first attachment head.

In another example embodiment, a luminaire mounting structure for mounting a recessed luminaire includes a first hanger bar assembly, a second hanger bar assembly, and a plaster frame. The first hanger bar assembly is attached to the plaster frame on a first side of the plaster frame, and the second hanger bar assembly is attached to the plaster frame on a second side of the plaster frame opposite the first side. Each of the first hanger bar assembly and the second hanger bar assembly includes a first hanger bar member and a second hanger bar member. The first hanger bar assembly and the second hanger bar assembly each includes a first hanger bar member and a first attachment head coupled to the first hanger bar member by a first coupling segment that is horizontally offset from the first hanger bar member. The first hanger bar assembly and the second hanger bar assembly each further includes a second hanger bar member slidably interlocked with the first hanger bar member and a second attachment head coupled to the second hanger bar member by a second coupling segment. An end portion of the first hanger bar member is designed to extend past the second attachment head. An end portion of the second hanger bar member is designed to extend past the first attachment head through a gap that is between the first hanger bar member and first attachment head.

These and other aspects, objects, features, and embodiments will be apparent from the following description and the claims.

BRIEF DESCRIPTION OF THE DRAWINGS

Reference will now be made to the accompanying drawings, which are not necessarily drawn to scale, and wherein.

Figure 1:
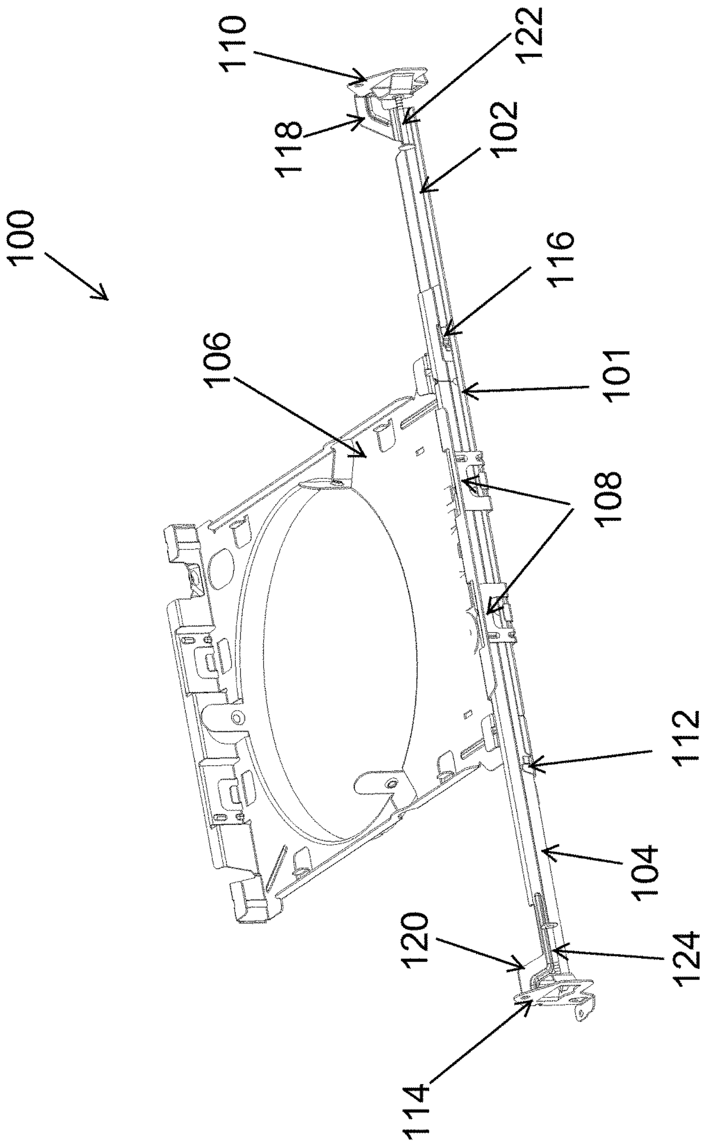
FIG. 1 illustrates a luminaire mounting structure including a hanger bar assembly according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 2:
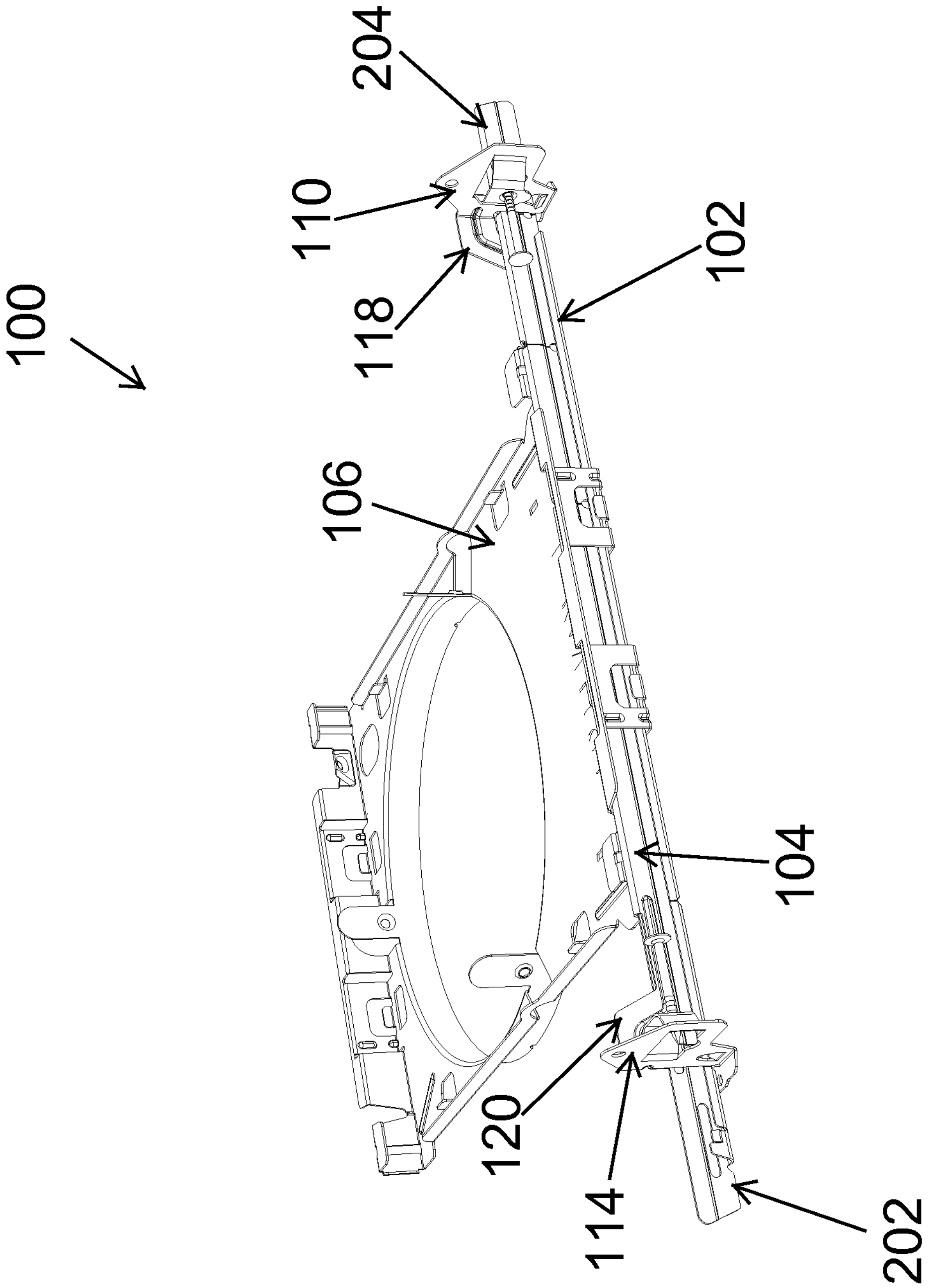
FIG. 2 illustrates the luminaire mounting structure including a hanger bar assembly in a more retracted position according to an example embodiment.

Turning now to the figures, example embodiments are described. FIG. 1 illustrates a luminaire mounting structure 100 including a hanger bar assembly 101 according to an example embodiment. FIG. 2 illustrates the luminaire mounting structure 100 with the hanger bar assembly 101 in a more retracted position according to an example embodiment. Referring to FIGS. 1 and 2, the luminaire mounting structure 100 includes the first hanger bar assembly 101 and the plaster frame 106. The first hanger bar assembly 101 is attached to a plaster frame 106. The luminaire mounting structure 100 may be used to install a luminaire, such as a recessed luminaire, to support structures, such as joists. For example, the support structures may be parallel support structures that are behind a ceiling. The hanger bar assembly 101 may be attached to the plaster frame 106 by passing the first hanger bar member 102 and the second hanger bar member 104 through the spaces between the attachment tabs 108 and the rest of the plaster frame 106. In some example embodiments, each attachment tab 108 may be a loop that is, for example, integrally formed with the plaster frame 106.

In some example embodiments, the hanger bar assembly 101 includes a first hanger bar member 102 and a second hanger bar member 104. The first hanger bar member 102 and the second hanger bar member 104 are interlocked with each other as illustrated in FIG. 1. The hanger bar assembly 101 is adjustable in length by slidably moving one or both of the first hanger bar member 102 and the second hanger bar member 104. The length adjustability allows use of the hanger bar assembly 101 with different pairs of support structures that have different spacings among the pairs. As illustrated in FIG. 2, an end portion 202 of the first hanger bar member 102 is positioned past the second attachment head 114 of the second hanger bar member 104, and an end portion 204 of the second hanger bar member 104 is positioned past the first attachment head 110 of the first hanger bar member 102.

In some example embodiments, the first hanger bar member 102 may include a stoppage structure 112, and the second hanger bar member 104 may include a stoppage structure 116. The stoppage structures 112, 116 may prevent or reduce the risk of unintended disengagement of the first hanger bar member 102 and the second hanger bar member 104 from each other, which will in turn prevent or reduce the risk of unintended disengagement of the hanger bar assembly 101 from the plaster frame 106. For example, the stoppage structures 112, 116 may abut against each other to prevent or reduce the risk of unintended disengagement.

In some example embodiments, the first hanger bar assembly 101 includes a first attachment head 110 and a second attachment head 114. The first attachment head 110 is coupled to the first hanger bar member 102 by a first coupling segment 118. The second attachment head 114 is coupled to the second hanger bar member 104 by a second coupling segment 120. The attachment heads 110, 114 are designed to secure the hanger bar assembly 101 to support structures, such as parallel joists, suspended ceiling T-grids, and/or steel framing. For example, the attachment head 110 may include a fastener 122 (e.g., a screw or a nail) that may be used to secure the attachment head 110 to a support structure. Similarly, the attachment head 114 may include a fastener 124 (e.g., a screw or a nail) that may be used to secure the attachment head 114 to another support structure.

Figure 3:
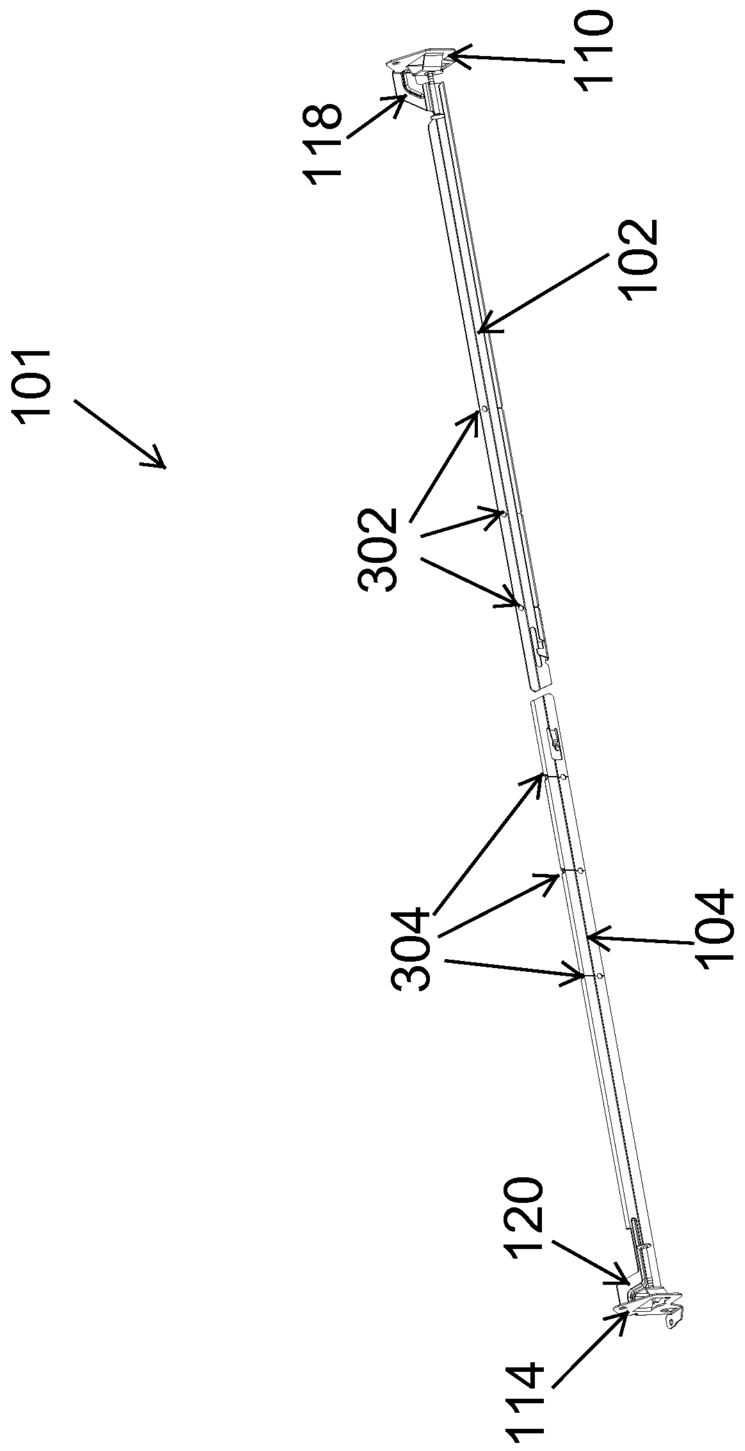
FIG. 3 illustrates the hanger bar assembly of FIGS. 1 and 2 according to an example embodiment.

FIG. 3 illustrates the hanger bar assembly 101 of FIGS. 1 and 2 according to an example embodiment. As illustrated in FIG. 3, the hanger bar assembly 101 includes the first hanger bar member 102 and the second hanger bar member 104. In FIG. 3, the first hanger bar member 102 and the second hanger bar member 104 are not interlocked with each other. The first hanger bar member 102 and the second hanger bar member 104 may be interlocked with each other as illustrated, for example, in FIG. 1. Once the first hanger bar member 102 and the second hanger bar member 104 are interlocked, the hanger bar assembly 101 is adjustable lengthwise (i.e., longitudinally).

As illustrated in FIG. 3, the first coupling segment 118 is coupled to the first hanger bar member 102 and to the first attachment head 110. To illustrate, the first coupling segment 118 is coupled to the first hanger bar member 102 at a first end of the first coupling segment 118 and is coupled to the first attachment head 110 at a second end of the first coupling segment 118. The second coupling segment 120 is coupled to the second hanger bar member 104 and to the second attachment head 114. For example, the second coupling segment 120 is coupled to the second hanger bar member 104 at a first end of the second coupling segment 120 and is coupled to the second attachment head 114 at a second end of the second coupling segment 120. As explained in more detail below, the first coupling segment 118 is horizontally offset from the first hanger bar member 102, and the second coupling segment 120 is substantially aligned with the second hanger bar member 104.

In some example embodiments, the first hanger bar member 102 includes score lines 302. Similarly, the second hanger bar member 104 may include score lines 304. For example, after the first hanger bar member 102 and the second hanger bar member 104 are attached to the plaster frame 106 in a manner similar to the assembly shown in FIG. 2, the end portions 202, 204 may be cut, broken, or bent at one of the respective score line 302, 304 to allow the hanger bar assembly 101 to fit between joists or inverted T-bars. Although three score lines are shown in FIG. 3, in alternative embodiments, the hanger bar members 102, 104 may include more or fewer than three score lines. Further, the score lines 302 may have different spacing from each other than shown in FIG. 3. Similarly, the score lines 304 may have different spacing from each other than shown in FIG. 3.

In some example embodiments, the first hanger bar member 102 and the second hanger bar member 104 may be made from steel by methods such as forming, stamping, etc. For example, the first hanger bar member 102 and the second hanger bar member 104 may be made from galvanized steel.

Figure 4:
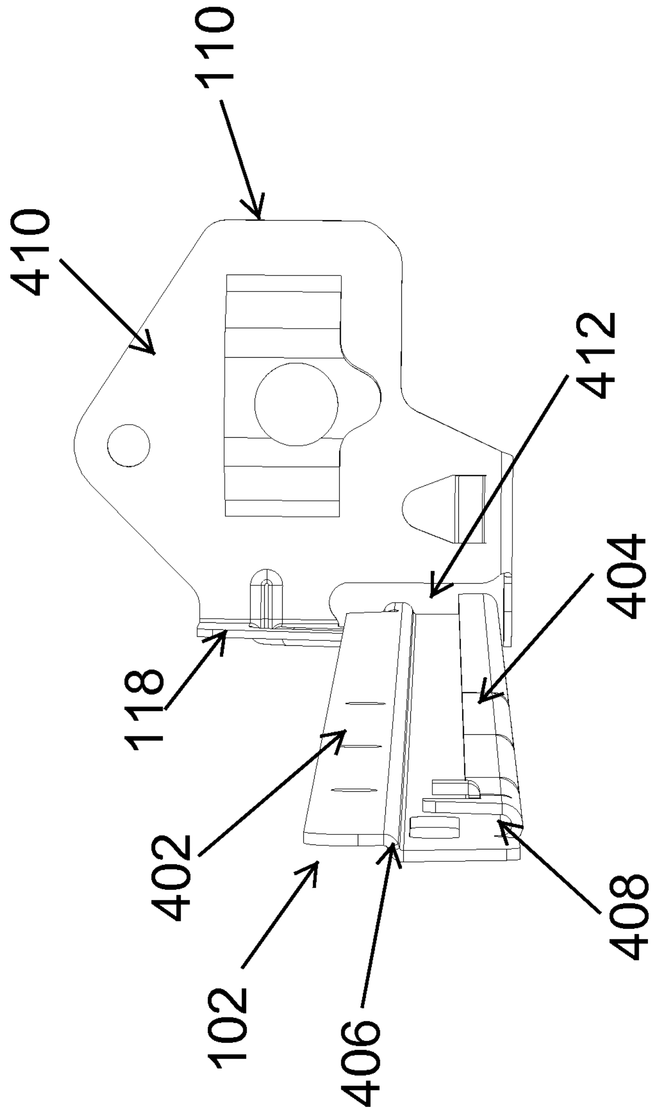
FIG. 4 illustrates a first hanger bar member of the hanger bar assembly of FIG. 3 according to an example embodiment.

FIG. 4 illustrates the hanger bar member 102 of the hanger bar assembly 101 of FIG. 3 according to an example embodiment. As illustrated in FIG. 4, the first hanger bar member 102 includes a rail segment 402 and a channel segment 404. The channel segment 404 includes a channel 408 that is bound by walls of the channel segment 404. For example, the channel 408 may have a U-shape. The first hanger bar member 102 may also include a middle segment 406 that extends between the rail segment 402 and the channel segment 404. For example, the middle segment 406 may extend from a wall of the channel segment 404 and may be slanted relative to the rail segment 402 and the wall of the channel segment 404 such that the rail segment 402 and wall of the channel segment 404 are horizontally offset from each other.

In some example embodiments, the first hanger bar member 102 is attached to the first attachment head 110 by the first coupling segment 118 that extends between the first hanger bar member 102 and the first attachment head 110. For example, the first coupling segment 118 may be attached to the first hanger bar member 102 at one end of the first coupling segment 118 and coupled to a wall 410 of the first attachment head 110 at another end of the first coupling segment 118. In some example embodiments, the wall 410 of the first attachment head 110 is substantially perpendicular to the first hanger bar member 102 as illustrated in FIG. 4.

In some example embodiments, a gap 412 that is between the first hanger bar member 102 and the first attachment head 110 allows the second hanger bar member 104 (shown in FIG. 3) to extend past the first attachment head 110. Because the first coupling segment 118 is horizontally offset from the rail segment 402 as more clearly shown in FIGS. 5A and 5B, an end portion of the second hanger bar member 104 can slidably move past the first attachment head 110 through the gap 412 when the first hanger bar member 102 is interlocked with the second hanger bar member 104.

In some example embodiments, the first hanger bar member 102, the first coupling segment 118, and the first attachment head 110 are integrally formed. Alternatively, one or more of the first hanger bar member 102, the first coupling segment 118, and the first attachment head 110 may be made separately and coupled to the other(s) by means such as soldering, riveting and welding.

Figure 5A:
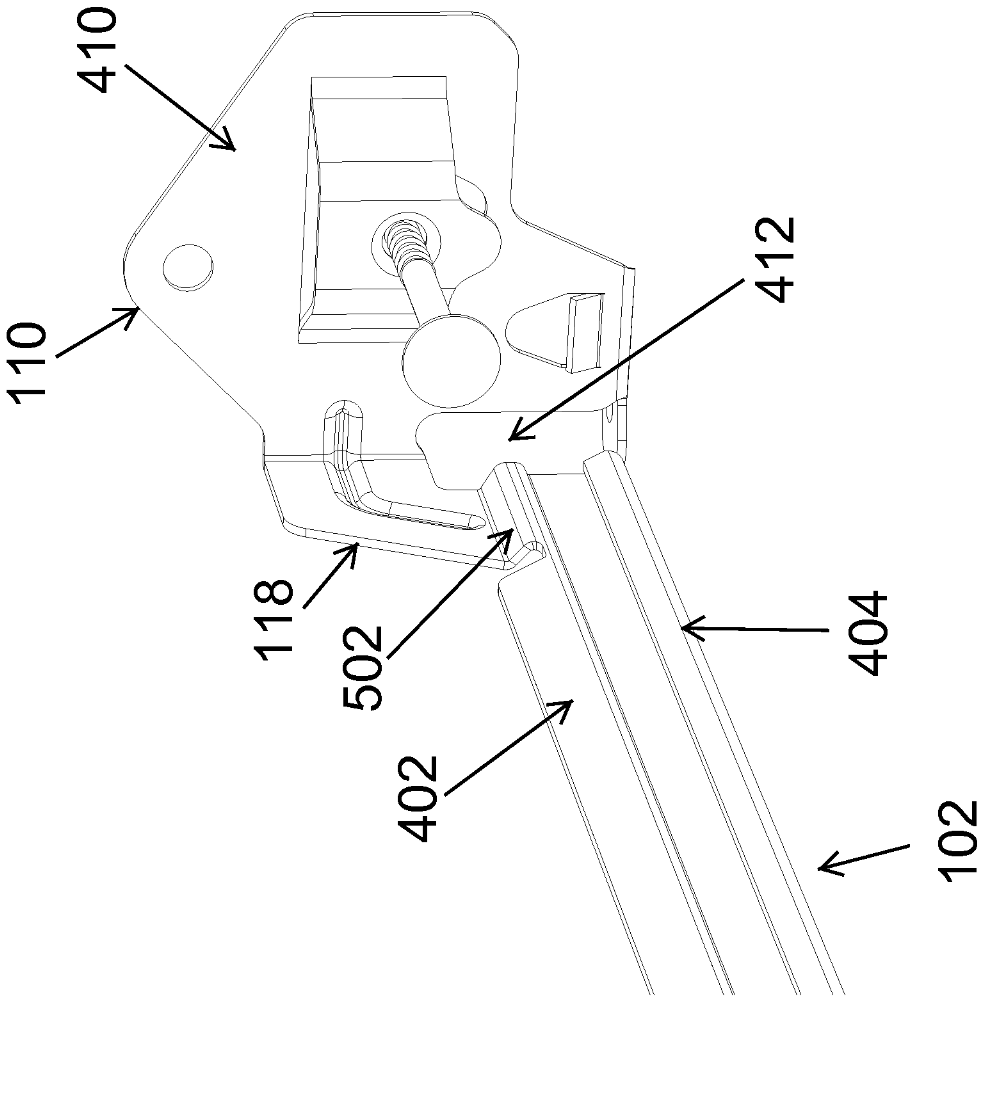
FIGS. 5A and 5B illustrate close-up views of the first hanger bar member of FIG. 4 according to an example embodiment.
Figure 5B:
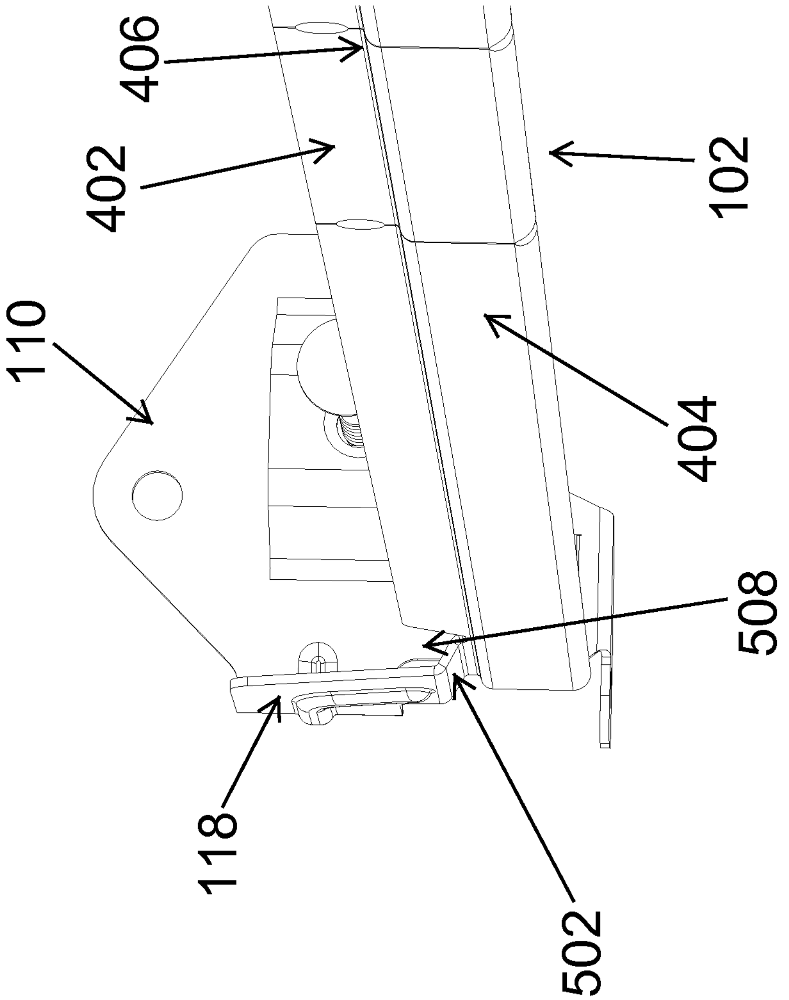

FIGS. 5A and 5B illustrate close-up views of the hanger bar member 102 of FIG. 4 according to an example embodiment. As illustrated in FIGS. 5A and 5B, the first coupling segment 118 is horizontally offset from the first hanger bar member 102. In some example embodiments, the first coupling segment 118 includes an offset segment 502 that is coupled to the first hanger bar member 102. For example, the offset segment 502 may extend angularly away from the first hanger bar member 102. In some example embodiments, the offset segment 502 may be slanted. In some example embodiments, the first coupling segment 118 is offset from the first hanger bar member 102 by a space 508.

As illustrated in FIGS. 5A and 5B, the first attachment head 110 is attached to first hanger bar member 102 at an end portion of the first hanger bar member 102. To illustrate, the first hanger bar member 102 is attached to the first attachment head 110 by the first coupling segment 118. The first coupling segment 118 is coupled to the first hanger bar member 102 at an end portion of the first hanger bar member 102. The first coupling segment 118 extends between the first hanger bar member 102 and the first attachment head 110. The first coupling segment 118 may be attached to the first hanger bar member 102 at one end of the first coupling segment 118 and coupled to a wall 410 of the first attachment head 110 at another end of the first coupling segment 118.

When the first hanger bar member 102 is interlocked with the second hanger bar member 104, for example, as shown in FIG. 2, the gap 412 allows a portion of the second hanger bar member 104 to extend past the first attachment head 110. Because the first coupling segment 118 is horizontally offset from the rail segment 402 of the first hanger bar member 102, a portion of the second hanger bar member 104 can pass through the gap 412 without being blocked by the first coupling segment 118. In the absence of the gap 412, a movement of the second hanger bar member 104 that is interlocked with the first hanger bar member 102 may be limited by the attachment head 110. In the absence of the offset segment 118, a movement of the second hanger bar member 104 that is interlocked with the first hanger bar member 102 may be limited by the first coupling segment 118.

Although the offset segment 502 is shown in FIGS. 5A and 5B as being slanted, in some alternative embodiments, the offset segment 502 may extend out horizontally from the first hanger bar member 102 or may have another shape. Further, in some example embodiments, the first coupling segment 118 may have a different shape than shown in FIGS. 5A and 5B without departing from the scope of this disclosure. The first coupling segment 118 may also be offset more or less than shown in FIGS. 5A and 5B without departing from the scope of this disclosure.

Figure 6:
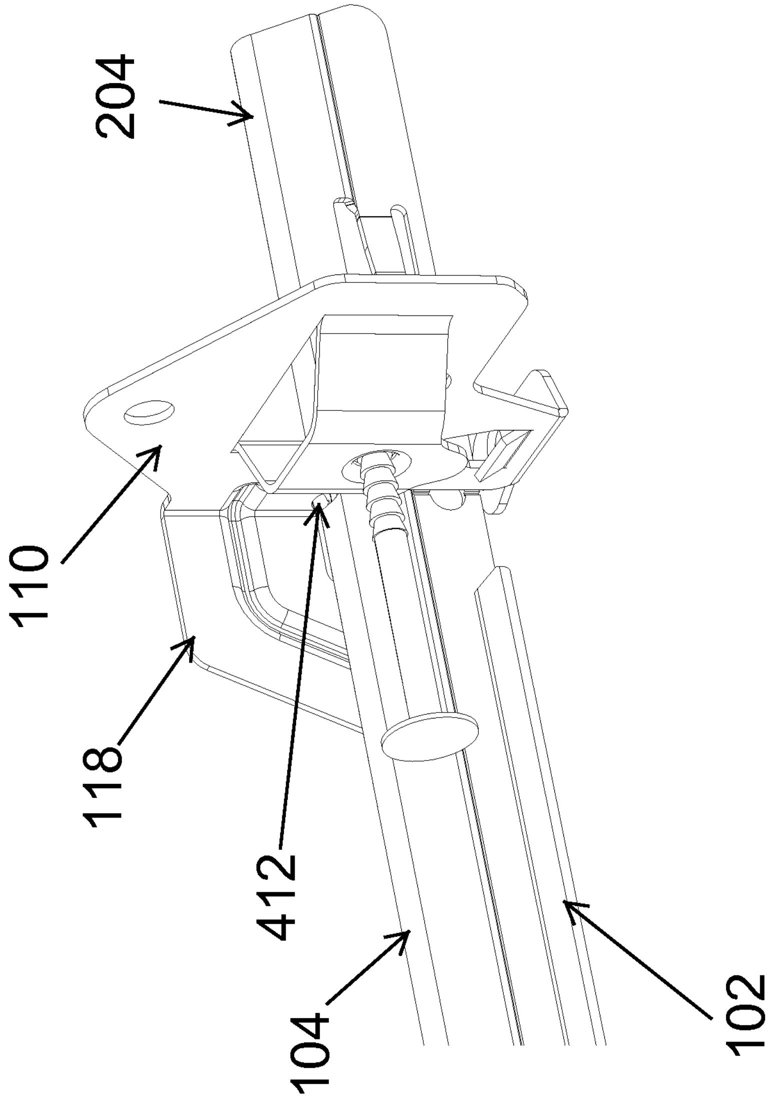
FIG. 6 illustrates a portion of a second hanger bar member of the hanger bar assembly of FIGS. 1 and 2 extending past an attachment head of the hanger bar member of FIG. 4 according to an example embodiment.

FIG. 6 illustrates a portion of the second hanger bar member 104 of the hanger bar assembly 101 of FIGS. 1 and 2 extending past the attachment head 110 of the hanger bar member 102 of FIG. 4 according to an example embodiment. In FIG. 6, the first hanger bar member 102 and the second hanger bar member 104 are interlocked with each other. As illustrated in FIG. 6, an end portion 204 of the second hanger bar member 104 extends past the first coupling segment 118 through the gap 412. Because the first coupling segment 118 is horizontally offset from the first hanger bar member 102, the first coupling segment 118 does not prevent the second hanger bar member 104 from passing through the gap 412.

In some example embodiments, a longer portion of the second hanger bar member 104 than shown in FIG. 6 may extend past the first attachment head 110.

Figure 7A:
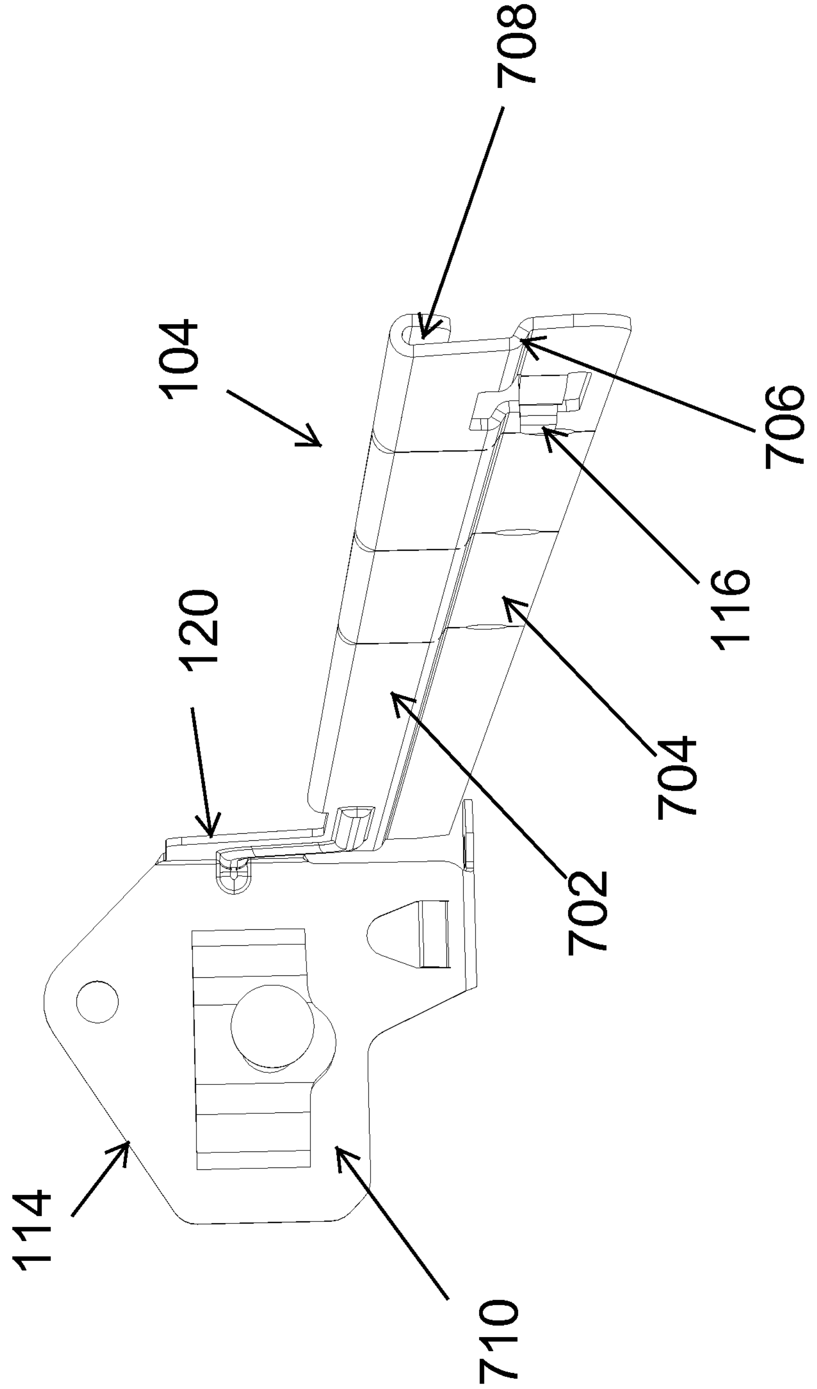
FIGS. 7A and 7B illustrate different views of a second hanger bar member of the hanger bar assembly of FIG. 3 according to an example embodiment.
Figure 7B:
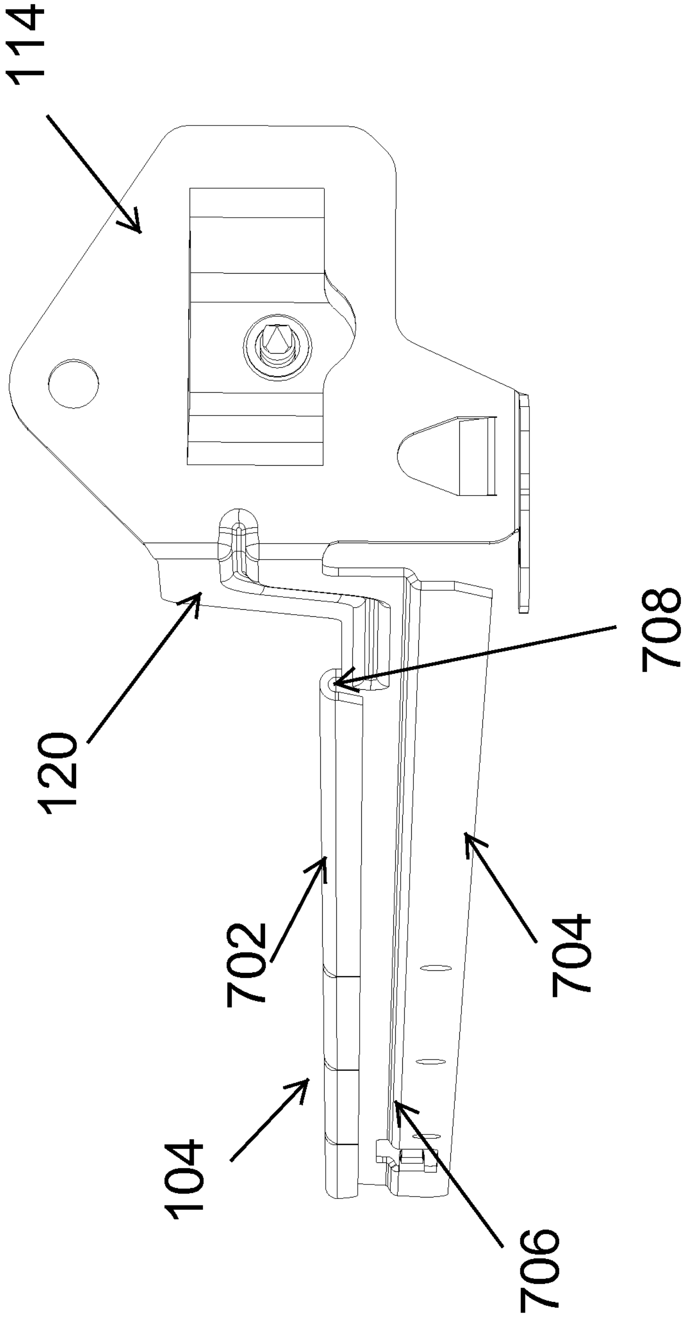

FIGS. 7A and 7B illustrate different views of the second hanger bar member 104 of the hanger bar assembly 101 of FIG. 3 according to an example embodiment. As illustrated in FIGS. 7A and 7B, the second hanger bar member 104 includes a channel segment 702 and a rail segment 704. The channel segment 702 includes a channel 708 that is bound by walls of the channel segment 702. For example, the channel 708 may have a U-shape. The second hanger bar member 104 may also include a middle segment 706 that extends between the channel segment 702 and the rail segment 704. For example, the middle segment 706 may extend out from a wall of the channel segment 702 and may be slanted relative to the rail segment 704 and the wall of the channel segment 702 where the rail segment 704 and wall of the channel segment 702 are horizontally offset from each other.

In some example embodiments, the second hanger bar member 104 includes the second stoppage tab 116 that is disposed proximal to an end portion of the second hanger bar 104. The second hanger bar member 104 is attached to the second attachment head 114 proximal to another end of the second hanger bar member 104. For example, the second coupling segment 120 may be attached to the second hanger bar member 104 at one end of the second coupling segment 120 and coupled to a wall 710 of the second attachment head 114 at another end of the second coupling segment 120. In some example embodiments, the wall 710 of the second attachment head 114 is substantially perpendicular to the second hanger bar member 104 as illustrated in FIGS. 7A and 7B.

In some example embodiments, the second hanger bar member 104, the second coupling segment 120, and the second attachment head 114 may be integrally formed. Alternatively, one or more of the second hanger bar member 104, second coupling segment 120, and the second attachment head 114 may be made separately and coupled to the other(s) by means such as soldering, riveting and welding. In some example embodiments, the second coupling segment 120 may be substantially vertically aligned with a wall of the channel segment 702 as illustrated in FIGS. 7A and 7B. In alternative embodiments, the second coupling segment 120 may be offset from the wall of the second hanger bar member 104, for example, toward the second attachment head 114. In some alternative embodiments, the second coupling segment 120 may have a shape other than shown in FIGS. 7A and 7B.

Figure 8A:
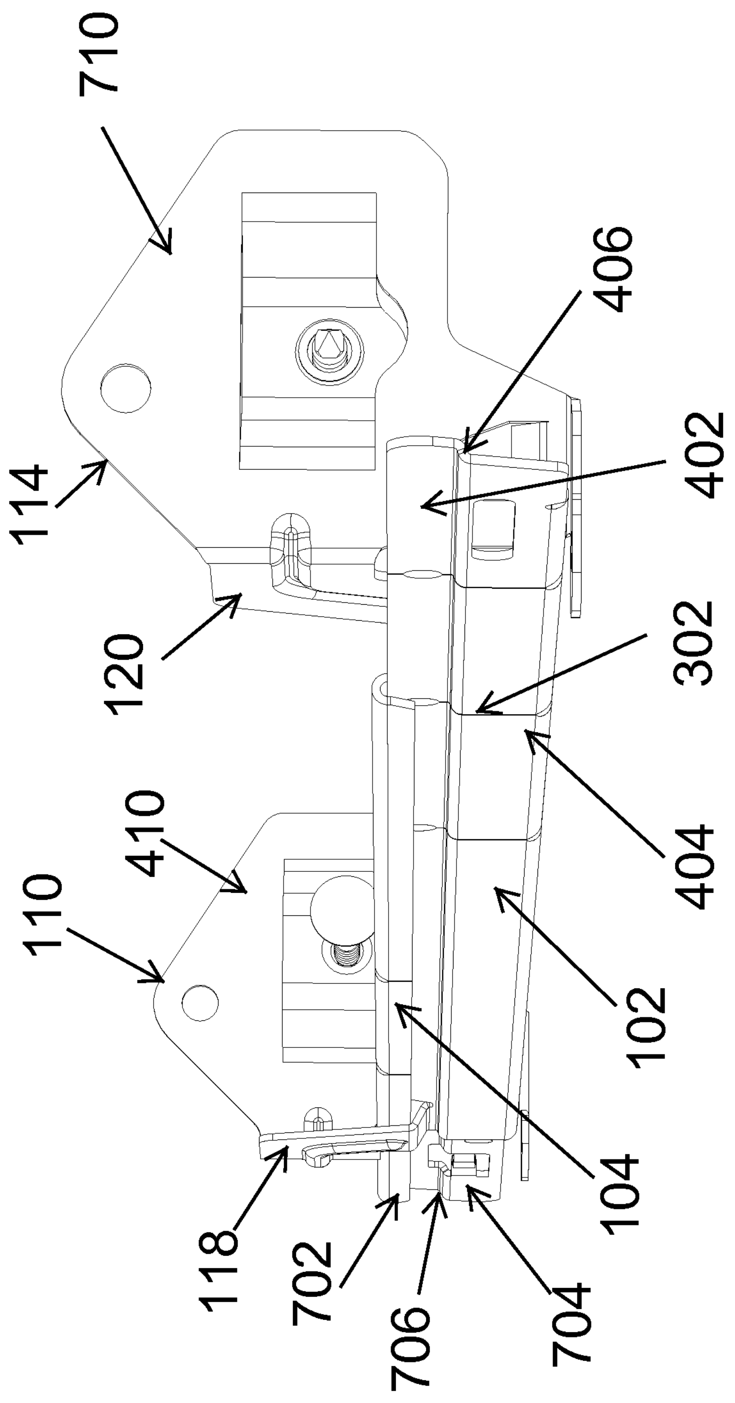
FIGS. 8A and 8B illustrate different views of the hanger bar members of the hanger bar assembly of FIG. 3 interlocked with each other according to an example embodiment.
Figure 8B:
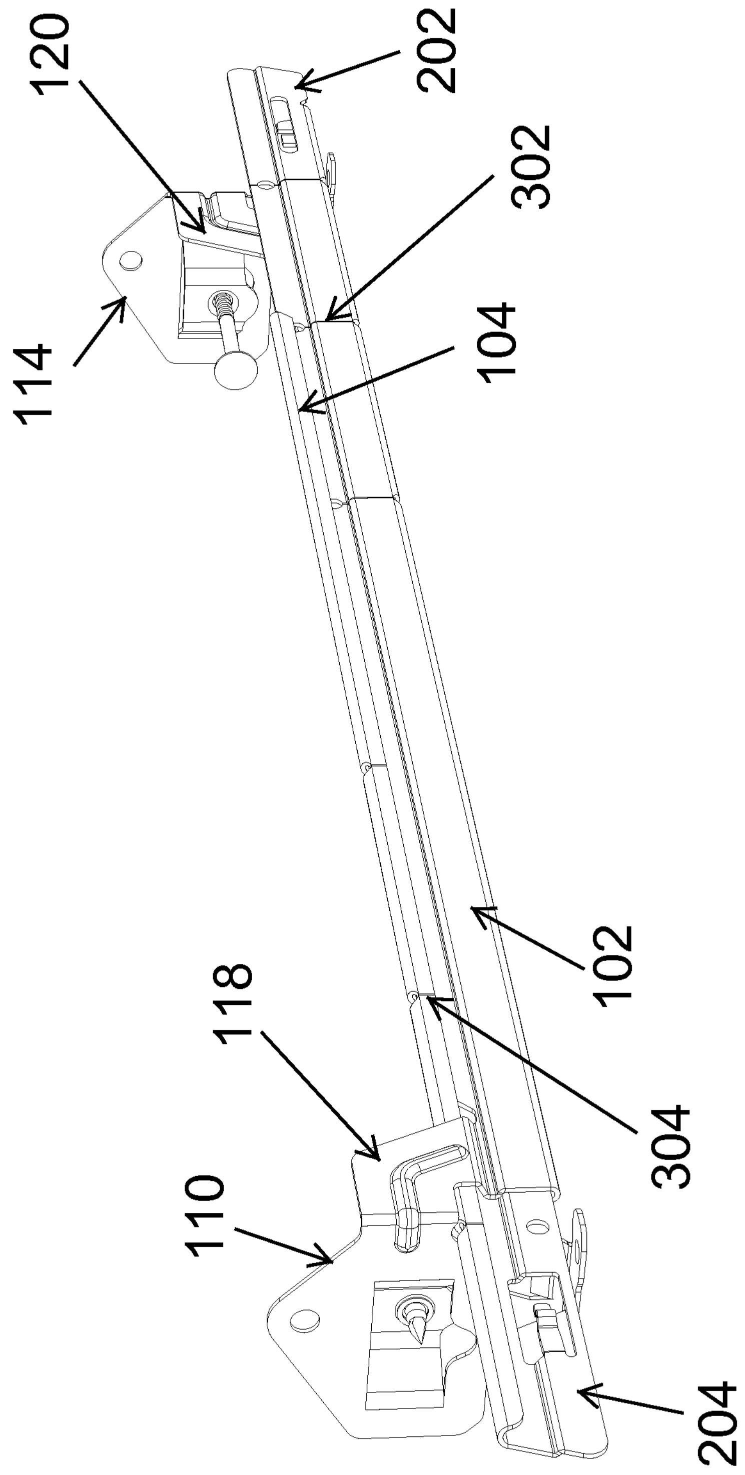

FIGS. 8A and 8B illustrate different views of the hanger bar members 102, 104 of the hanger bar assembly 101 of FIG. 3 interlocked with each other according to an example embodiment. As illustrated in FIGS. 8A and 8B, the rail segment 402 of the first hanger bar member 102 is positioned in the channel 708 (shown in FIGS. 7A and 7B) of the channel segment 702 of the second hanger bar member 104. The rail segment 704 of the second hanger bar member 104 is positioned in the channel 408 (shown in FIG. 4) of the channel segment 404 of the first hanger bar member 102.

Figure 8C:
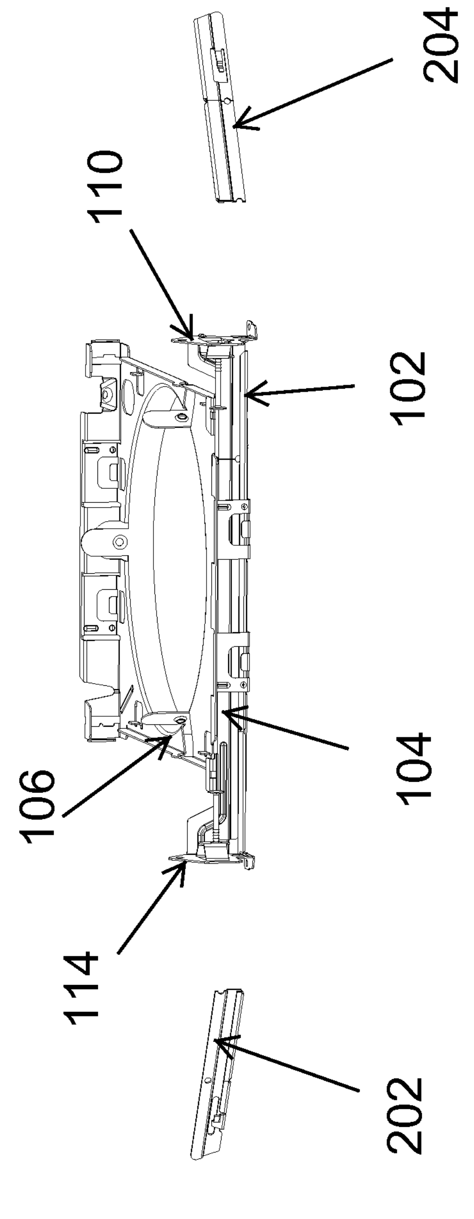
FIG. 8C illustrates end portions of the hanger bar members broken off after moving past the attachment heads according to an example embodiment.

As illustrated in FIGS. 8A and 8B, a portion of the first hanger bar member 102 is extended past the second attachment head 114. Similarly, a portion of the second hanger bar member 104 is extended past the first attachment head 110. For example, the first coupling segment 118 is adjacent to the channel segment 702 of the second hanger bar member 104 when the end portion 204 of the second hanger bar member 104 extends past the first attachment head 110. The second coupling segment 120 is adjacent to the first rail segment 402 of the first hanger bar member 102 when the end portion 202 of the first hanger bar member 102 extends past the second attachment head 114. To illustrate, the end portion 202 of the first hanger bar member 102 extends past the second attachment head 114 on a side of the second hanger bar member 104 facing away from the second attachment head 114. In some example embodiments, the end portion 202 that is extended past the attachment head 114 may be broken off at a score line as illustrated in FIG. 8C. Similarly, the end portion 204 that is extended past the attachment head 110 may be broken off at a score line as illustrated in FIG. 8C.

FIG. 8C illustrates end portions 202, 204 of the hanger bar members 102, 104 broken off after moving past the attachment heads 110, 114 according to an example embodiment. As illustrated in FIG. 8C, the first hanger bar member 102 and the second hanger bar member 104 are attached to the plaster frame 106 and interlocked with each other. The first hanger bar member 102 is broken off at the score line 302 shown in FIG. 8B, and the second hanger bar member 104 is broken off at the score line 304 shown in FIG. 8B. To illustrate, in some example embodiments, after the hanger bar assembly 101 of FIG. 1 is received by an installer, the installer may adjust the length of the hanger bar assembly 101, for example, similar to FIG. 2. The installer may then shorten the hanger bar assembly 101 by breaking off the hanger bar members 102, 104 at one of the respective score lines 302, 304 shown in FIG. 3 such that the hanger bar assembly 101 fits between a particular pair of joists or inverted T-bars. Because the hanger bar members 102, 104 can be shortened by breaking off their respective end portions 202, 204 that extend beyond the attachment heads 114, 110, respectively, at the score lines 302, 304, the length of the hanger bar assembly 101 of the luminaire mounting structure 100 (FIG. 1) and the luminaire mounting structures 1102, 1104 (FIGS. 11 and 12) may be adjusted by an installer.

Figure 9A:
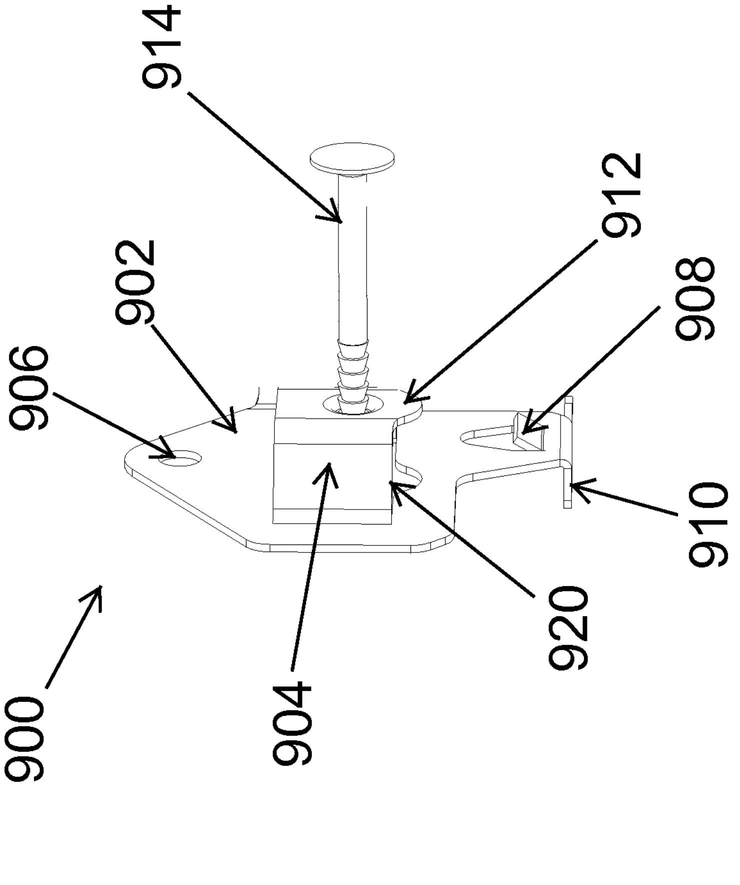
FIGS. 9A and 9B illustrate various views of an attachment head of the hanger bars of the hanger bar assembly of FIGS. 1 and 2 according to an example embodiment.
Figure 9B:
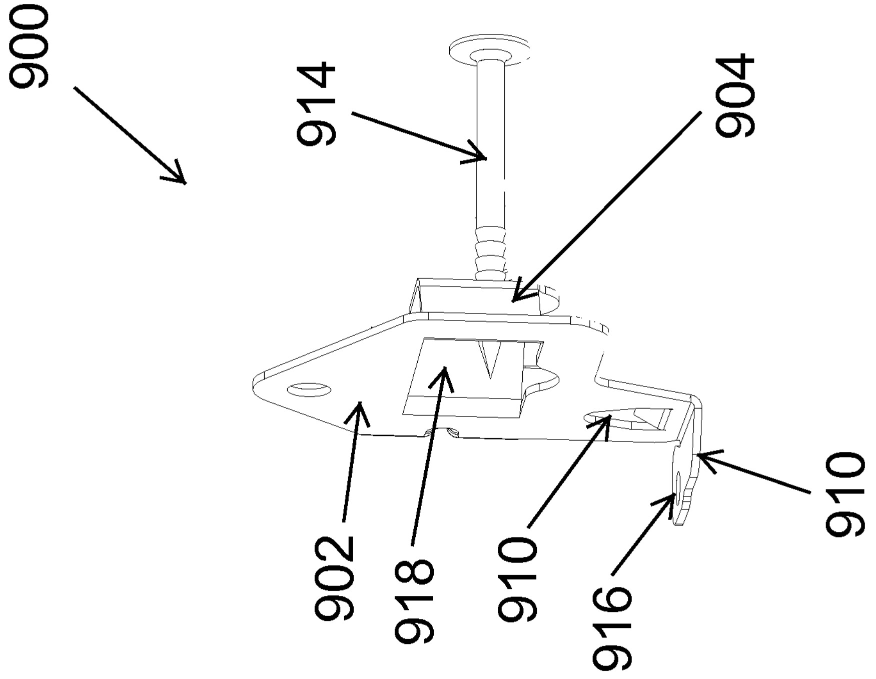

FIGS. 9A and 9B illustrate various views of an attachment head 900 of the hanger bar members 102, 104 of the hanger bar assembly 101 of FIGS. 1 and 2 according to an example embodiment. For example, the attachment head 900 may correspond to the first attachment head 110 and the second attachment head 114 shown in FIG. 1. In some example embodiments, the attachment head 900 includes a wall 902 and a horizontal bump 904 extending out from the wall 902. For example, the horizontal bump 904 may be formed by punching out a portion of the wall 902. To illustrate, a cavity 918 may be formed when the bump 904 is formed. A fastener 914 (e.g., a nail, a screw, etc.) may be attached to the horizontal bump 904. In some example embodiments, the fastener 914 may be used to attach the attachment head 900 to a support structure such as a joist.

Figure 11:
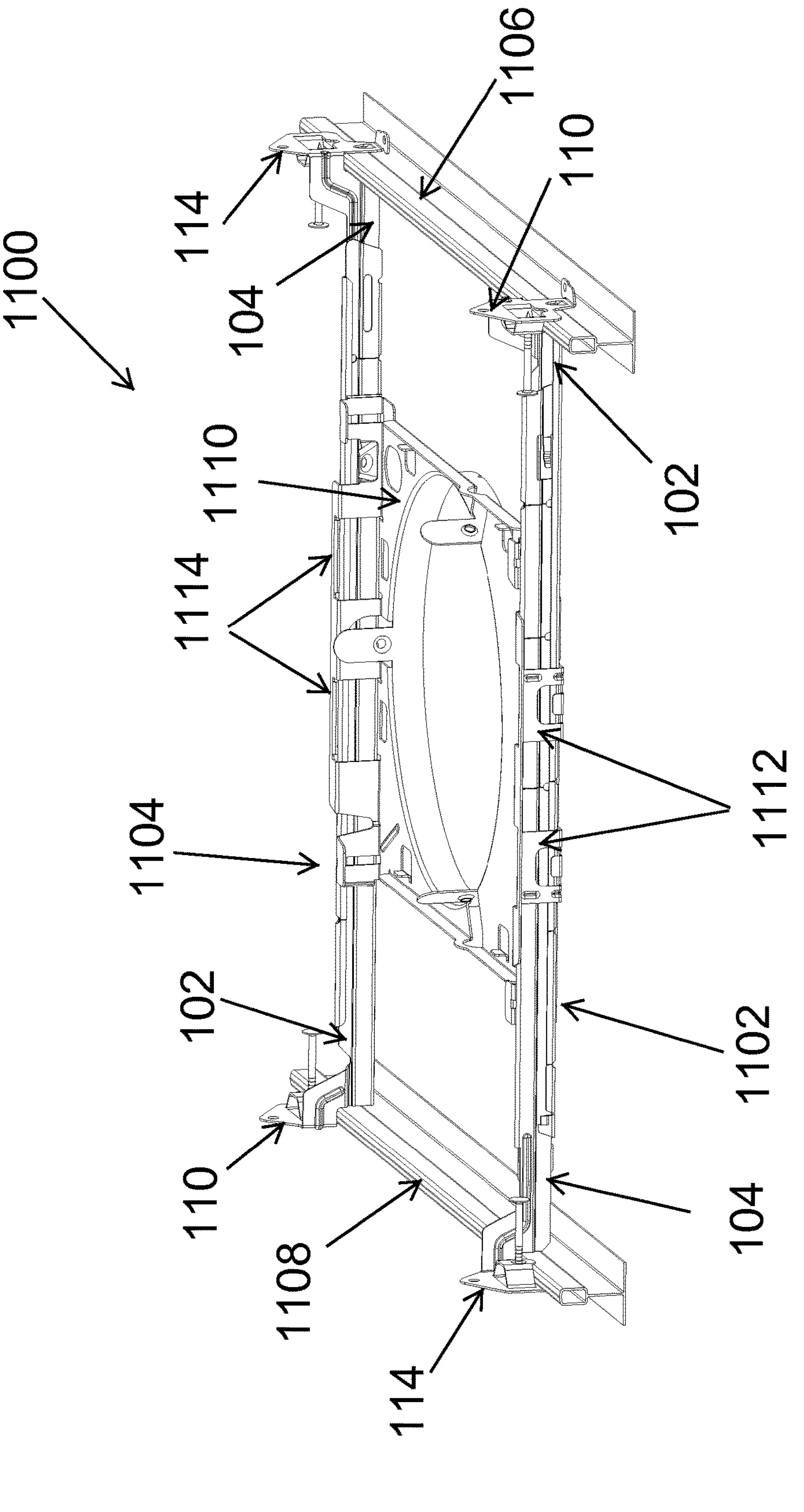
FIG. 11 illustrates a luminaire mounting structure attached to inverted T-bars according to an example embodiment.

In some example embodiments, the horizontal bump 904 includes a tab 912 extending down on a side of the bump 904 that is parallel to the wall 902. In some example embodiments, bump 904 may rest on a support structure such as an inverted T-bar such that the wall 902 and the tab 912 are on opposite sides of the inverted T-bar. For example, an edge 920 of the bump 904 may be in contact with a top surface of an inverted T-bar such as shown in FIG. 11.

In some example embodiments, the attachment head 900 has an aperture 906 in the wall 902. For example, a fastener such as a screw or a nail may be inserted through the aperture 906 to secure the attachment head 900 to a support structure.

In some example embodiments, the attachment head 900 may include a flange 910 extending substantially horizontally from a bottom end of the wall 902 and in a direction away from the bump 904. The flange 910 may have an aperture 916 for securing the attachment head 900 to a support structure by inserting a fastener (e.g., a nail or a screw) through the aperture 916.

In some example embodiments, a tab 908 may angularly extend upward from the wall 902 proximal to a bottom end of the wall 902. For example, the tab 908 may help prevent vertical detachment of the attachment head 900 from a support structure such as an inverted T-bar. In some example embodiments, a fastener may be extended through the opening 910 to securely attach the wall 902 to a support structure.

Although the fastener 914 is shown as attached to the bump in FIGS. 9A and 9B, in some alternative embodiments, the fastener 914 may be omitted and one or more means of securing the attachment head 900 to a support structure may be used as described above.

Figure 10:
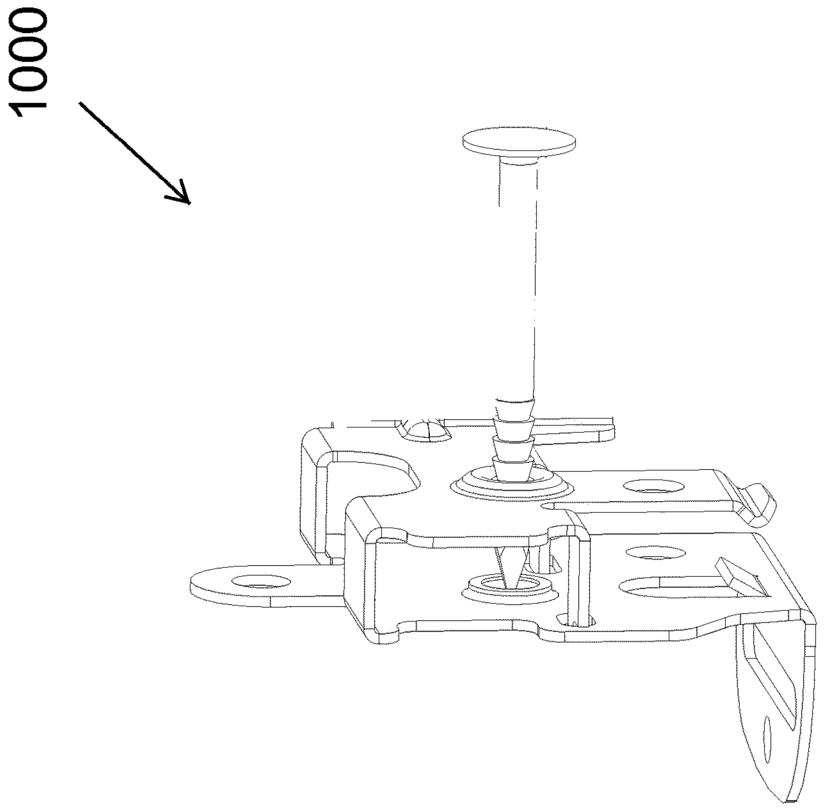
FIG. 10 illustrates an attachment head of the hanger bars of the hanger bar assembly of FIGS. 1 and 2 according to another example embodiment.

FIG. 10 illustrates an attachment head 1000 of the hanger bars members 102, 104 of the hanger bar assembly 101 of FIGS. 1 and 2 according to another example embodiment. In some example embodiments, the hanger bar members 102, 104 may include the attachment head 1000 instead of the attachment head 900 of FIGS. 9A and 9B. In some alternative embodiments, the hanger bar members 102, 104 may include an attachment head other than the attachment heads 900, 1000 without departing from the scope of this disclosure.

FIG. 11 illustrates a luminaire mounting structure 1100 attached to inverted T-bars according to an example embodiment. The luminaire mounting structure 1100 includes a first hanger bar assembly 1102 and a second hanger bar assembly 1104. The first hanger bar assembly 1102 and the second hanger bar assembly 1104 are attached to the plaster frame 1106 at opposite sides of the plaster frame 1110. For example, the first hanger bar assembly 1102 and the second hanger bar assembly 1104 may correspond to the hanger bar assembly 101 of FIG. 1, and the plaster frame 1110 may correspond to the plaster frame 106 of FIG. 1. In some example embodiments, a luminaire housing, such as a housing of a recessed luminaire, may be positioned on the plaster frame 1110.

To illustrate, the first hanger bar assembly 1102 and the second hanger bar assembly 1104 each includes the first hanger bar member 102 and the second hanger bar member 104 that are coupled to respective attachment heads 110, 114. The first hanger bar member 102 and the second hanger bar member 104 of the first hanger bar assembly 1102 may be positioned through passages formed by tabs 1112. Similarly, the first hanger bar member 102 and the second hanger bar member 104 of the second hanger bar assembly 1104 may be positioned through passages formed by tabs 1114.

As illustrated in FIG. 11, the attachment heads 110, 114 of each hanger bar assembly 1102, 1104 may be attached to parallel inverted T-bars 1106, 1108. Because of the adjustability of the hanger bar assemblies 1102, 1104, the hanger bar assemblies 1102, 1104 may be attached to parallel inverted T-bars that have relatively small or large spacings between them.

Figure 12:
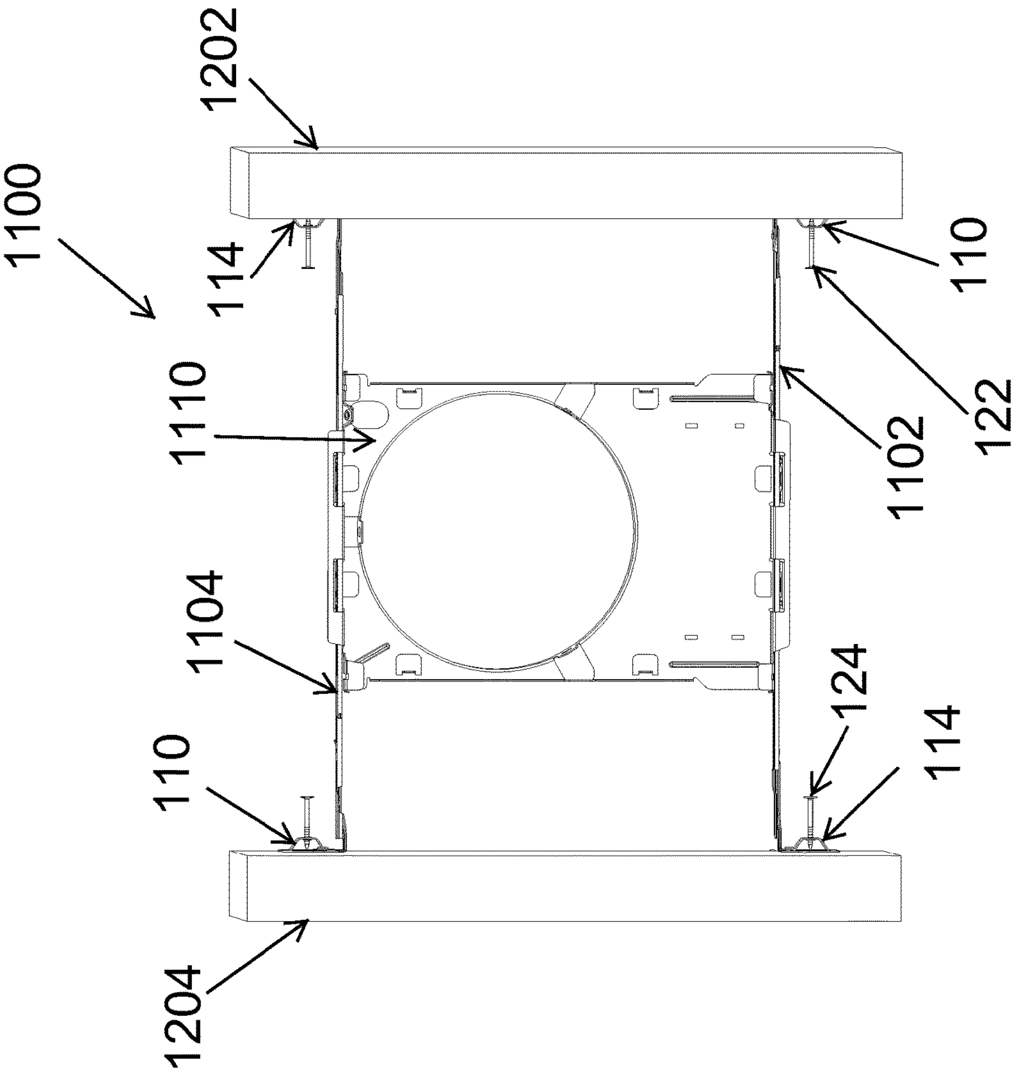
FIG. 12 illustrates a luminaire mounting structure attached to joists according to an example embodiment.

FIG. 12 illustrates the luminaire mounting structure 1100 of FIG. 11 attached to joists according to an example embodiment. As illustrated in FIG. 12, the attachment heads 110, 114 of each hanger bar assembly 1102, 1104 may be attached to parallel joists 1202, 1204. For example, the attachment heads 110, 114 may be secured to the joists 1202, 1204 using respective fasteners 122, 124. Because of the adjustability of the hanger bar assemblies 1102, 1104, the hanger bar assemblies 1102, 1104 may be attached to parallel joists that have relatively small or large spacings between them.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A hanger bar assembly, comprising:

a first hanger bar member;

a first attachment head coupled to the first hanger bar member by a first coupling segment that is horizontally offset from a longitudinal outer edge of the first hanger bar member;

a second hanger bar member; and a second attachment head coupled to the second hanger bar member by a second coupling segment, wherein the first hanger bar member and the second hanger bar member are designed to interlock with each other, wherein an end portion of the first hanger bar member is designed to extend past the second attachment head, and wherein an end portion of the second hanger bar member is designed to extend past the first attachment head through a gap that is between the first hanger bar member and first attachment head.

2. The hanger bar assembly of claim 1, wherein the first hanger bar member comprises a first rail segment and a first channel segment, the first channel segment having a first channel, wherein the second hanger bar member comprises a second rail segment and a second channel segment, the second channel segment having a second channel, wherein the first rail segment is positioned in the second channel, and wherein the second rail segment is positioned in the first channel.

3. The hanger bar assembly of claim 2, wherein the first coupling segment is adjacent to the second channel segment when the second hanger bar member extends past the first attachment head.

4. The hanger bar assembly of claim 2, wherein the second coupling segment is adjacent to the first rail segment when the first hanger bar member extends past the second attachment head.

5. The hanger bar assembly of claim 2, wherein the second coupling segment is substantially vertically aligned with a wall of the second channel segment.

6. The hanger bar assembly of claim 2, wherein the first hanger bar member further comprises a first middle segment extending between the first rail segment and the first channel segment that are horizontally offset from each other and wherein the second hanger bar member further includes a second middle segment extending between the second rail segment and the second channel segment that are horizontally offset from each other.

7. The hanger bar assembly of claim 1, wherein the end portion of the first hanger bar member extends past the second attachment head on a side of the second hanger bar member facing away from the second attachment head.

8. The hanger bar assembly of claim 1, wherein the first coupling segment includes an offset segment coupled to and extending angularly away from the first hanger bar member.

9. The hanger bar assembly of claim 1, wherein the first attachment head and the second attachment head attach the hanger bar assembly to parallel support structures.

10. The hanger bar assembly of claim 1, wherein a wall of the first attachment head is substantially perpendicular to the first hanger bar member and wherein a wall of the second attachment head is substantially perpendicular to the second hanger bar member.

11. A hanger bar assembly, comprising:

a first hanger bar member;

a first attachment head coupled to the first hanger bar member by a first coupling segment that is horizontally offset from a longitudinal outer edge of the first hanger bar member;

a second hanger bar member slidably interlocked with the first hanger bar member; and a second attachment head coupled to the second hanger bar member by a second coupling segment, wherein an end portion of the first hanger bar member is designed to extend past the second attachment head and wherein an end portion of the second hanger bar member is designed to extend past the first attachment head through a gap that is between the first hanger bar member and first attachment head.

12. The hanger bar assembly of claim 11, wherein the first hanger bar member comprises a first rail segment and a first channel segment, the first channel segment having a first channel, wherein the second hanger bar member comprises a second rail segment and a second channel segment, the second channel segment having a second channel, wherein the first rail segment is positioned in the second channel, and wherein the second rail segment is positioned in the first channel.

13. The hanger bar assembly of claim 12, wherein the first coupling segment is adjacent to the second channel segment when the second hanger bar member extends past the first attachment head.

14. The hanger bar assembly of claim 12, wherein the second coupling segment is adjacent to the first rail segment when the first hanger bar member extends past the second attachment head.

15. The hanger bar assembly of claim 12, wherein the second coupling segment is substantially vertically aligned with a wall of the second channel segment.

16. The hanger bar assembly of claim 11, wherein the first coupling segment includes an offset segment coupled to and extending angularly away from the first hanger bar member.

17. A luminaire mounting structure for mounting a recessed luminaire, the luminaire mounting structure comprising:

a first hanger bar assembly;

a second hanger bar assembly; and a plaster frame, wherein the first hanger bar assembly is attached to the plaster frame on a first side of the plaster frame, wherein the second hanger bar assembly is attached to the plaster frame on a second side of the plaster frame opposite the first side, wherein each of the first hanger bar assembly and the second hanger bar assembly comprises a first hanger bar member and a second hanger bar member, wherein the first hanger bar assembly and the second hanger bar assembly each comprises:

a first hanger bar member;

a first attachment head coupled to the first hanger bar member by a first coupling segment that is horizontally offset from a longitudinal outer edge of the first hanger bar member;

a second hanger bar member slidably interlocked with the first hanger bar member; and a second attachment head coupled to the second hanger bar member by a second coupling segment, wherein an end portion of the first hanger bar member is designed to extend past the second attachment head and wherein an end portion of the second hanger bar member is designed to extend past the first attachment head through a gap that is between the first hanger bar member and first attachment head.

18. The luminaire mounting structure of claim 17, wherein the first hanger bar member comprises a first rail segment and a first channel segment, the first channel segment having a first channel, wherein the second hanger bar member comprises a second rail segment and a second channel segment, the second channel segment having a second channel, wherein the first rail segment is positioned in the second channel, and wherein the second rail segment is positioned in the first channel.

19. The luminaire mounting structure of claim 18, wherein the first coupling segment is adjacent to the second channel segment when the second hanger bar member extends past the first attachment head.

20. The luminaire mounting structure of claim 18, wherein the second coupling segment is substantially vertically aligned with a wall of the second channel segment.

* * * * *